United States Patent Office 3,822,333
Patented July 2, 1974

3,822,333
PROCESS FOR PRODUCING SHAPED ARTICLES OF CRYSTALLINE POLYOLEFINS HAVING A ROUGHENED SURFACE
Hiroshi Haruta, Ichiharashi, Seio Mukai, Chibashi, and Tadao Ishibashi, Ichiharashi, Japan, assignors to Chisso Corporation, Osaka, Japan
Continuation-in-part of abandoned application Ser. No. 22,380, May 24, 1970. This application July 31, 1972, Ser. No. 276,279
Claims priority, application Japan, Apr. 2, 1969, 44/25,311
Int. Cl. B29c 25/00
U.S. Cl. 264—179
7 Claims

ABSTRACT OF THE DISCLOSURE

Shaped articles such as film, sheet, tape or filaments, of crystalline polyolefin resins such as polypropylene or polyethylene, having a uniformly and remarkably roughened surface, and useful for the production of synthetic paper, synthetic pulp, string, woven fabric, knitted products, etc., can be prepared by cooling and solidifying a crystalline polyolefin resin extruded from a die which is in a molten but preformed state, by contacting with a specified solvent having a boiling point of 30°–400° C. and maintained at a temperature which is in the range of 0°–100° C. and lower than said boiling point and does not dissolve said crystalline polyolefin resin, which solvent is used alone for cooling or in the form floating upon another cooling liquid.

RELATED APPLICATION

Figure 1:
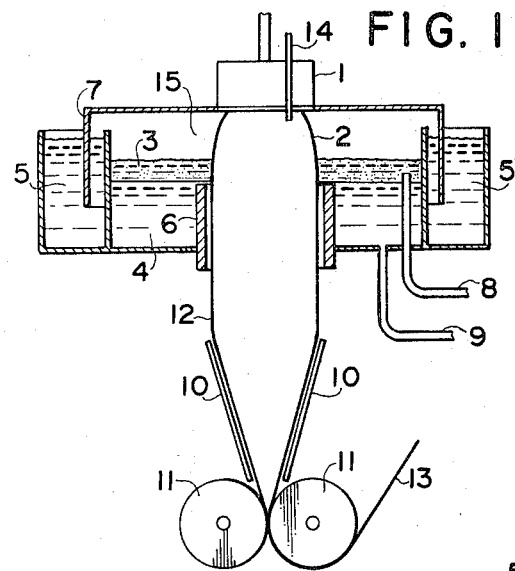

This application is a continuation-in-part of Ser. No. 22,380 filed on May 24, 1970, now abandoned.

DESCRIPTION OF THE INVENTION

The present invention relates to a process for producing shaped articles of crystalline polyolefin resins having roughened surface. More particularly, it relates to a process for producing shaped articles such as film, sheet, tape or filaments, which comprises cooling and solidifying a crystalline polyolefin resin extruded from a die and being in a molten but preformed state, in contact with a specified solvent.

Crystalline polyolefins, for example, polypropylene, polyethylene, propylene-ethylene copolymer, poly-4-methylpentene-1, polybutene-1, have found a large variety of applications in the manufacture of shaped articles such as films, sheets, tubes, tapes, filaments and the like. The surfaces of these shaped articles are generally smooth, lustrous and superior to those of other polymers in appearance but they are not suitable for writing with a pen, and have poor printability and poor adhesiveness.

Heretofore, many processes for making coarse the surfaces of shaped articles of crystalline polyolefins have been proposed. For example, there are known embossing process, sand blasting process, chemical etching process, solvent treating process, foaming process, pigment-mixing process and the like. In the case of shaped articles such as sheets or films, an embossing process is carried out by a chill roll having coarse surface or an embossing roll. This process cannot be carried out without special apparatuses such as embossing rolls or pattern rolls. Further a method which makes coarse the surface of shaped articles by admixing a foaming agent into a material to be shaped to foam at the time of shaping is not preferable because it gives a certain kind of change not only upon the surface of shaped articles but also to the constructional properties of shaped articles themselves. On the other hand, such treating methods as sand blasting, chemical etching and solvent treating have been heretofore carried out in additional steps after once shaped articles of polyolefins are manufactured. However, they have defects in that they need a complicated and prolonged processing step, and also their operational efficiency is generally poor. Among the above-mentioned processes, the solvent-treatment has not been easy to carry out, because, when crystalline polyolefin resins are used, there has been no solvent capable of dissolving them at low temperatures. Namely, any solvent has no appreciable dissolving power for crystalline polyolefin resins at room temperature; above 60° C., a certain kind of solvent comes to exhibit a partially dissolving power; and in order to exhibit a completely dissolving power, a higher temperature is necessary.

Accordingly, in the treatment of the surface of shaped articles of polyolefin resins with a solvent, it is a conventional process to immerse said shaped articles in a solvent heated to a suitable temperature capable of dissolving said resins, for a suitable period of time, to dissolve the surface portion of the shaped articles having reached the temperature capable of dissolving said portion, followed by taking out and cooling the articles, and removing a remaining portion of the solvent. Further, in order to improve effectiveness attained by the treatment and to shorten the time necessary for the treatment, shaped articles are often treated with a heated solvent after preheated to a temperature in the range where the shaped articles are not thermally deformed. However, if these processes are applied to sheets or films having a thickness of 1 mm. or less, or tapes or filaments having a size of 1 mm. or less, the temperature of solvent as well as the preheating temperature of resin cannot be raised over the melting temperature of the resin in order to avoid the risk of deformation of the shaped articles. Accordingly, in order to obtain sufficient surface-roughening effectiveness, a treating time of at least several seconds, usually several minutes, is necessary even at a temperature close to the melting point, and further a treating time of at least one minute, usually several ten minutes, is necessary at a temperature lower than 100° C. For example, Tessandori et al. (U.S. Pat. 3,179,484) have proposed a process of treatment for at least one minute with a solvent having a temperature lower than 100° C. The effectiveness of this process consists in that dyed articles having a good dye receptivity and a large color fastness can be obtained in the successive dyeing step. Accordingly, in this case, surface-roughening does not seem to be attained in spite of such a long treating period of time as at least one minute, even though the shaped articles may be swollen. Further, there is no description relative to the surface-roughening in the reference. In fact, as shown in the Comparative Examples described below, no outstanding surface-roughening effectiveness as in the present invention can be attained according to Tessandori et al.'s process. As mentioned above, there has never been disclosed a process in which the surface-roughening of crystalline polyolefin resins can be attained within a very short time of less than several seconds, by the use of a solvent which is incapable of dissolving once solidified crystalline polyolefin resins at a temperature lower than 100° C. under the atmospheric pressure, at said temperature.

The first object of the present invention is to provide a uniformly and remarkably surface-roughened shaped article of crystalline polyolefin resins having fine rises and falls on the surface.

The second object of the present invention is to provide a method in which no apparatus is necessary for a post-treatment which is usually used for a melt-extrusion shaping and requires a long retention time, thereby to make the whole treatment cost inexpensive.

The third object of the present invention is to provide a method for preventing the thermal deformation of shaped articles during the heating step which is liable to occur in the case of post-treatment and also particularly in thinner products.

Other objects will be clarified by the following description.

The above-mentioned objects can be attained by the method of the present inventors.

According to the method of the present invention, the surface of shaped articles can be remarkably roughened just after the melt-extrusion shaping of crystalline polyolefin resins, by cooling and solidifying said resins in a molten but preformed state, by contacting with a specified solvent having an affinity with said resins in the molten but preformed state, but not dissolving said resins cooled to a temperature in a specified range at which the solvent is maintained, by the contact with the solvent.

It is surprising enough that there is a great difference in the surface-roughening effectiveness between a shaped article preheated to a temperature below the melting point of said resins and treated with a solvent, and a shaped article obtained by extruding said resins from a die and treating the resulting resins in a molten but preformed state, with a solvent. Namely, as shown in the Examples and Comparative Examples described below, a remarkable surface-roughening can be attained from resins in a molten state, but such an effect cannot be attained from a shaped article preheated to a temperature below the melting points of said resins.

Further surprisingly, the surface-roughening treatment in a molten state can be completed within a very short time of at most several seconds necessary for cooling and solidifying the surface of a shaped article in the cooling step of melt-extrusion shaping. Moreover, the surface-roughening treatment in a molten state becomes feasible only by combining with the cooling step, because the resulting roughened surface obtained in a molten state is set only by cooling.

The present invention resorts to a process for producing shaped articles such as film, sheet, tape or filaments of crystalline polyolefin resins having a thickness of 1 mm. or less and a roughened surface, which comprises cooling and solidifying a crystalline polyolefin resin melt-extruded from a die and being in a molten but preformed state, by contacting with a solvent selected from the group consisting of aliphatic, aromatic, alicyclic or halogenated hydrocarbons, heterocyclic compounds and esters of aliphatic alcohols and aliphatic or aromatic carboxylic acids, each having a boiling point of 30°–400° C., and maintained at a temperature which is in the range of 0°–100° C. and lower than said boiling point, and at which said crystalline polyolefin resin is not dissolved, which solvent is used alone for cooling or in the form floating upon another cooling liquid.

According to the present invention, a shaped article of crystalline polyolefins having a uniformly and remarkably roughened surface can be readily prepared. Further, since cooling and solidification are carried out simultaneously with solvent-treatment in the present invention, the apparatus and time for the processing of post-treatment can be saved as compared with the conventional solvent-treatment carried out after shaping and solidification, and hence an economical advantage can be thereby obtained. Furthermore, there is no fear of thermal deformation which is liable to occur in the heating step of post-treatment and also particularly in the case of thinner shaped articles. Still further, the adjustment of treatment strength is easier than in the case of post-treatment. Further, surprisingly, even a solvent, such as n-hexane, n-heptane, or the like, which is incapable of dissolving once solidified crystalline polyolefins such as some polypropylenes and some high density polyethylenes at a temperature lower than the boiling point of the solvent under the atmospheric pressure, can exhibit a sufficient surface-roughening performance according to the process of the present invention.

Further, according to the process of the present invention, when the molten resin is cooled and solidified, both the dissolution of its surface portion into a solvent and the precipitation of the dissolved resin due to the successive cooling, are completed within an extremely short time, that is, almost instantaneously, and hence there is no time for the dissolved resin enough to be dispersed out of the surface of the shaped article and the almost all portion of the dissolved resin are precipitated and deposited onto the surface of the shaped article. Accordingly, there is no loss of the resin and a very good efficiency is brought about.

The above-mentioned effectivenesses of the present invention can be attained by cooling and solidifying a crystalline polyolefin resin in a molten state, extruded from a die, while contacting it with a solvent, in a cooling liquid. Concretely, the resin in a molten state, extruded from a die is cooled and solidified by being put into a solvent vessel or a vessel of a cooling liquid floating a solvent on its surface.

The solvents to be used in the present invention are aliphatic, aromatic, alicyclic or halogenated hydrocarbons, heterocyclic compounds or esters of aliphatic alcohols and aliphatic or aromatic carboxylic acids. Among them, it is preferable to use aliphatic or alicyclic hydrocarbons having a boiling point of 30°–100° C., because, in the case of solvents having lower boiling points, the removal of solvent after the treatment is more readily carried out, for example, by evaporation, and further, when the treatment is carried out at a temperature which is in the above-mentioned ranges and at which the resins are not dissolved, more uniform and finer surface-roughening treatment becomes possible.

Concretely, there are illustrated as aliphatic hydrocarbons, pentane, hexane, heptane, octane, nonane, decane, gasoline, petroleum ether, petroleum benzine, ligroin, kerosene, gas oil, liquid paraffin, etc.; as aromatic hydrocarbons, benzene, toluene, xylene, etc.; as alicyclic hydrocarbons, cyclopentane, cyclohexane, methylcyclohexane, cycloheptane, decahydronaphthalene, tetrahydronaphthalene, etc.; as halogenated hydrocarbons, monochloropropane, monochlorobutane, monochloropentane, trichloroethane, tetrachloroethane, trichloroethylene, tetrachloroethylene, etc.; as heterocyclic compounds, tetrahydrofuran, etc.; and as said esters, propyl acetate, butyl acetate, amyl acetate, dioctyl adipate, dioctyl sebacate, dioctyl phthalate, etc. Solvents having a boiling point lower than 30° C. are not economical, because they must be used in the treatment, in a state cooled to a particularly low temperature, due to their large volatility. The above-mentioned solvents can be used also as a mixture with each other or with a diluent therefor. By these means, the extent of surface-roughening of the shaped article of the present invention can be controlled.

Solvents in a solvent vessel or solvents floating on a cooling liquid, in the present invention, as mentioned above, must be maintained at a temperature which is in the range of 0°–100° C. and lower than the boiling point of the solvents and at which the shaped article of the polyolefin resins is not dissolved. If the temperature of solvent exceeds 100° C., an excessive treatment or an excessive dissolution of resin occurs. On the other hand, if the temperature is lower than 0° C., treatment is insufficient.

As for crystalline polypropylene, it is preferable that the temperature of solvent is in the range of 0°–70° C., while, as for high density polyethylene, it is preferable that the temperature is in the range of 0°–60° C. In these ranges, the resins are not dissolved, and more uniform and fine surface-roughening is possible.

The temperature at which the above-mentioned resins become soluble or are dissolved, means the lowest temperature at which the resins in the form of small pieces are dissolved by maintaining them at a constant temperature for 10 minutes with stirring in such a solvent as gives a ratio of solvent to polymer of about 100:1.

Since crystalline polyolefin resins contain usually a small amount of non-crystalline portion, this portion may be extracted by the above-mentioned solvents even when the crystalline portion as main component is not dissolved. However, if the amount of such an extracted portion is less than 10% by weight, the present invention can be effectively carried out.

The temperature at which the resins are dissolved in the solvents, varies depending upon the combination of the resins and the solvents, but, generally, if a temperature used is lower than the following, the resins will not be dissolved in the solvents of the present invention:

| | |
|---|---|
| Crystalline polypropylene | 70° C. |
| High density polyethylene | 60° C. |
| Low density polyethylene | } 40° C. |
| Medium density polyethylene | |

When a vessel of a cooling liquid floating a solvent thereon is used in the present invention, the cooling liquid must be the one having a specific gravity greater than that of the solvent and also capable of forming a separate phase from that of the solvent, and maintained at a temperature equal to or lower than that of the solvent. The difference between the specific gravity of the solvent and that of the cooling liquid, is preferable to be more than 0.1, in order to prevent a disturbance in the form of droplets, along the boundary between the solvent and the cooling liquid. Whether or not the solvent and the cooling liquid form separate phases from each other, can be judged by introducing the both into a vessel, stirring and allowing them to stand.

As for the cooling liquid, water, aqueous solutions of inorganic substances, mercury, liquids of organic substances, etc. can be used. Among them, water and aqueous solutions are particularly preferable since they have a large cooling capacity and are economical. If the specific gravity of the solvent is close to that of water, the difference in specific gravity can be made larger by using aqueous solutions of inorganic substances or the like.

The advantages of using a vessel of a cooling liquid floating a solvent layer thereon, in the present invention, are as follows: the retention time of the resin in the solvent can be shortened thereby to reduce an undesirable swelling of the shaped article with the solvent; the amount of the solvent to be used is small; if a cooling liquid having a large cooling capacity such as water is used, the amount of the solvent evaporated in the treatment is small; and the extent of treatment can be adjusted by varying the thickness of the solvent layer. The thickness of the solvent layer floated on the cooling liquid is preferable to be more than 0.5 mm., in order to obtain a sufficient surface-roughening effectiveness. The solvent should be supplied as it is consumed.

In the present invention, the strength of treatment or the depth of the roughened surface layer formed by the treatment can be adjusted by varying the temperature of the solvent. The higher the temperature, the rougher and the deeper the treated layer. In addition, when a vessel of a cooling liquid floating a solvent thereon is used in the present invention, the solvent is attached onto the surface of the resin in the form of film and pulled into the cooling liquid since the solvent has a great affinity for the resin. Thus, the contact of the solvent with the resin is maintained also in the cooling liquid. Accordingly, the higher the temperature of the cooling liquid which decides the temperature of the accompanying solvent, the stronger the extent of treatment.

The temperature of the solvent or the cooling liquid in the present invention can be readily controlled by well-known cooling or heating means. Particularly when a solvent having a low boiling point is used, it is preferable to use the solvent or the cooling liquid sufficiently cooled, in order to prevent its evaporation. If the boiling point of the solvent is lower than the temperature of the molten resin, it is preferable to seal the vessel, in order to prevent the solvent vapor from escaping. Sealing is carried out using an inert gas such as nitrogen, for safety and in order to avoid the loss of solvent. In such a case, even when the pressure is altered to either slightly greater or smaller than the atmospheric one, the gist of the present invention is not altered thereby.

The time necessary for the surface of the resin in a molten state to be cooled and solidified, is very short as in the general case where the resin is cooled by water, that is, several tenth second or at most several seconds. The surface-roughening of the present invention is effected within such a short period of time. The resulting roughened surface is fixed along with the cooling and solidification of the surface, and not dissolved away at the time of subsequent cooling of the polyolefin resin in the solvent. The cooling of the entire shaped article is also usually completed in one minute or less when the article has a thickness of 1 mm. or less; and in about ½ second when it has a thickness of about 0.03 mm.

The method of the present invention can be applied for delustering, surface-roughening, capacity-making of shaped articles for the purpose of beautification or variation of the product. Further, it can also be applied for the improvements in writability, printability, dyeability or adhesiveness.

As for the shaped articles to which the present invention can be applied, sheet, film, tape and filaments can be illustrated. Further it can be applied to the articles requiring uniaxial or biaxial stretching.

The shaped articles prepared according to the process of the present invention are suitable for producing synthetic paper, synthetic pulp, string, woven fabrics, knitted products by utilizing the properties of crystalline polyolefins, particularly, crystalline polypropylene and high density polyethylene, having superior rigidity, strength, hardness, stretchability, etc. A coating capable of affording adhesiveness or printability can be applied to the surface. Further, a press roll or a heating roll can be used in order to control the roughness of the surface layer of the resin or to increase the strength thereof.

It is possible to add additives such as stabilizers, antistatic agents, adhesion-, printability- or dyeability-improving agents, pigments or the like and fillers such as reinforcing agents, extenders, to the crystalline polyolefin resins to be used in the present invention.

The effectiveness of the treatment of the present invention can be promoted by adding pigments or fillers to the resin. Namely, their addition makes the structure of the surface finer and more rigid.

Further, in the present invention, the above mentioned additives can be also added to the solvent, not to the crystalline polyolefin resins. Further, in the present invention, a solution obtained by dissolving in the solvent of the present invention, a resin other than the crystalline polyolefin resins to be surface-treated, for example, those capable of making the surface of the crystalline polyolefin resin, sticky; a suspension obtained by suspensing in the solvent of the present invention, a resin; or an inorganic compound in a finely divided state, for example, those capable of increasing the roughness of the surface of the crystalline polyolefin resins, can be used in place of the solvent alone.

The solvent remaining on the surface of the shaped articles after completing the treatment, cooling and solidification according to the present invention, can be removed by any drying means such as a hot air, when a solvent having a high volatility is used and by washing with another volatile solvent followed by drying when a less volatile solvent is used.

In order that the invention may be well understood, the following examples are given by way of illustration only.

EXAMPLE 1

An experiment was carried out using an apparatus as shown in FIG. 1 of the accompanying drawings.

The numerals shown in FIG. 1 refer to the following matters:

1. circular die
2. molten tube
3. solvent
4. cooling water
5. sealing water
6. cooling cylinder
7. sealing cover
8. solvent-feeding pipe
9. cooling water-feeding pipe
10. guiding plate
11. pinch roll
12. treated tubular film
13. laid-flat film
14. air-inlet pipe
15. space filled with nitrogen gas An isotactic polypropylene having an intrinsic viscosity of 1.40 as measured in Tetralin at 135° C. and an isotactic index (extraction residue after 10 hrs. reflux in n-heptane) of 96% was melt-extruded from a circular die 1 at 220° C. using a usual extruder, into a molten tube 2, which was then expanded by air supplied through an air-inlet pipe 14. n-Hexane 3 as a solvent at 20° C. was continuously fed through a solvent-feeding pipe 8, which solvent was floated on cooling water 4 at 20° C., while maintaining a thickness of layer of 3 mm., the surface of the solvent being located 100 mm. below the lower end of the die lip. The cooling water 4 was also continuously fed through a cooling water-feeding pipe 9. The expanded film was introduced into the inside of a cooling cylinder 6 having a length of 150 mm. whose inner wall surface was wetted by allowing the cooling liquid floating the solvent thereupon to overflow from its upper edge, whereby the film was cooled and solidified by the contact with the wetted inner surface. The resulting treated tubular film 12 was flattened by a guiding plate 10 and pinch rolls 11 and taken up at a take-up speed of 5 m./min. to give a laid-flat film 13. The n-hexane remaining on the surface of film was removed by evaporation by blowing a hot air at 60° C. Thus, a surface-roughened film designated as Sample No. 1 was obtained. The vapor of solvent formed by the contact with a high temperature molten resin and occupying the space 15 filled with nitrogen gas is prevented from escaping to the outside by means of a sealing cover 7 and a sealing water 5.

The above-mentioned procedure was repeated except that only water was used for cooling (without using n-hexane) to give Sample No. 2. No roughened surface was obtained in the case of Sample No. 2. The properties of films of No. 1 and No. 2 are shown in the following Table.

| Sample | Thickness (μ) | Surface | Lustre (percent) | Percentage transmission | Appearance of surface |
|---|---|---|---|---|---|
| 1 | 110 | Inner | 92 | 2.7 | Smooth. |
|   |   | Outer | 10 |   | Roughened. |
| 2 | 100 | Inner | 101 | 88 | Smooth. |
|   |   | Outer | 110 |   | Smooth. |

Sample No. 1 had an outer surface remarkably roughened according to the treatment of the present invention. It was a mat film having an opaque, white and paper-like appearance. On the other hand, No. 2 was a transparent lustrous film.

EXAMPLE 2

A tubular film was obtained from an isotactic polypropylene having an intrinsic viscosity of 1.40 and an isotactic index of 90%, in a similar manner to Example 1 using the same apparatus as in Example 1, except that a liquid paraffin was substituted for n-hexane; the temperatures of cooling water and the liquid paraffin were both 40° C.; and the take-up speed was 30 m./min. The resulting folded film was led into a vessel of n-hexane to replace the liquid paraffin attached on the surface of film by n-hexane. The n-hexane attached was then evaporated by blowing a hot air at 60° C. to give a surface-roughened film (Sample No. 3).

The above-mentioned procedure was repeated except that only water was used for cooling (without using liquid paraffin) to give Sample No. 4. Both of the Sample Nos. 3 and 4 had a thickness of about 30μ. No. 4 was transparent and lustrous, whereas No. 3 according to the present invention was white and opaque and had a mat and paper-like appearance.

| Sample No. | Lustre of outer surface (percent) | Percentage transmission |
|---|---|---|
| 3 | 25 | 12 |
| 4 | 93 | 85 |

EXAMPLE 3

Figure 2:
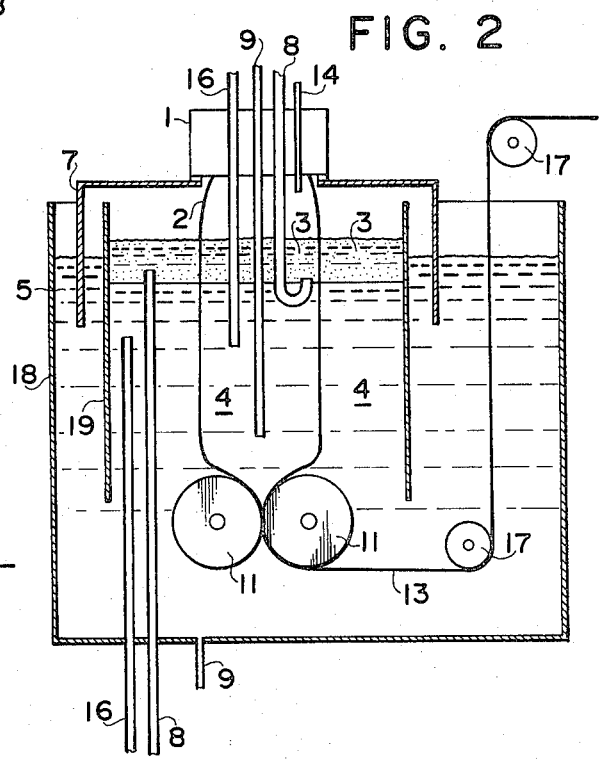

An experiment was carried out using an apparatus as shown in FIG. 2.

The numerals shown in FIG. 2 refer to the following matters:

1. circular die
2. molten tube
3. solvent
4. cooling water
5. sealing water
7. sealing cover
8. solvent feeding pipe
9. cooling water-feeding pipe
11. pinch roll
13. laid-flat tube
14. air-inlet pipe
16. cooling water-discharging pipe
17. guide roll
18. cooling water vessel
19. solvent-separating plate An isotactic polypropylene having an intrinsic viscosity of 1.40 and an isotactic index of 96% was melt-extruded from a circular die 1 at 220° C. using a usual extruder, into a tubular film, which was then expanded by air supplied through an air-inlet pipe 14. n-Heptane 3 as a solvent at 20° C. was continuously fed through a solvent-feeding pipe 8, which solvent was floated on cooling water 4 at 20° C., while maintaining a thickness of 3 mm. in the form of layer, the surface of the solvent being located 100 mm. below the lower end of the die lip. The cooling water 4 was also continuously fed through a cooling water-feeding pipe 9. The expanded film was cooled and solidified by introducing it into the cooling water floating the solvent thereupon. The film thus solidified was flattened by means of pinch rolls 11 having a nip line at a distance of 300 mm. from the surface of the solvent, and taken up as a laid-flat film 13 at a take-up speed of 5 m./min. through a guide roll 17. In this case, the cooling water inside and outside the film is circulated by means of a cooling water-feeding pipe 9 and a cooling water-discharging pipe 16 to maintain a constant temperature. Further, n-heptane 3 inside and outside the film is continuously fed through a solvent-feeding pipe 8 so as to maintain a constant thickness of the layer, since a small amount of solvent is lost by accompanying the film. The tubular film thus obtained was cut open, and n-heptane remaining on the surface of film, was removed by evaporation by blowing hot air to give Sample No. 5 having roughened surfaces.

The above-mentioned procedure was repeated except that toluene was substituted for n-heptane to give Sample No. 6. Further, Sample No. 7 was similarly obtained without using any solvent. As shown in the following Table, Sample Nos: 5 and 6 prepared according to the present invention were white and opaque and both had a paper-like and mat appearance on both the surfaces, whereas Sample No. 7 as a control was lustrous and transparent.

| Sample No. | Thickness (μ) | Surface | Lustre (percent) | Percentage transmission | Appearance |
|---|---|---|---|---|---|
| 5 | 120 | Inner / Outer | 13 / 11 | 1.2 | Roughened surface, white, opaque, paper-like. Do. |
| 6 | 120 | Inner / Outer | 10 / 8 | 1.0 | Roughened surface, white, opaque, paper-like. Do. |
| 7 | 100 | Inner / Outer | 116 / 112 | 90 | Flat and smooth surface, non-color, transparent. Do. |

EXAMPLE 4

Figure 3:
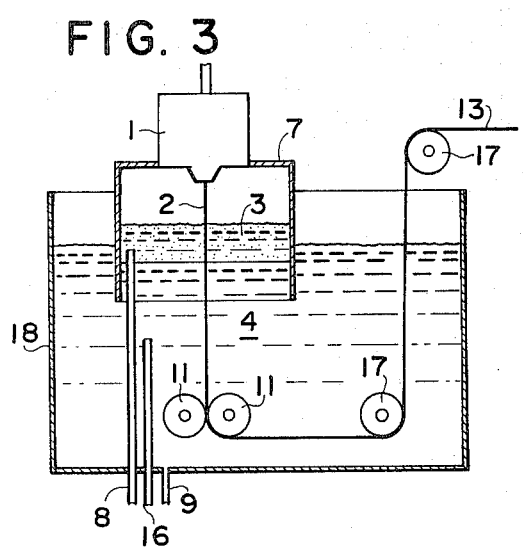

This Example was carried out using an apparatus as shown in FIG. 3. The numerals in FIG. 3 refer to the following matters:

1 T-die
2 molten web
3 solvent
4 cooling water
7 sealing cover having also a role as a solvent-separating plate
8 solvent-feeding pipe
9 cooling water-feeding pipe
11 pinch roll
13 treated film
16 cooling water-discharging pipe
17 guide roll
18 vessel of cooling water A high density polyethylene having a melt index of 0.5 at 190° C. and a density of 0.955 was melt-extruded from a T-die 1 at 170° C. by means of a usual extruder. The extruded film was introduced into a cooling water 4 floating thereupon a solvent layer of n-hexane 3 at 20° C. in a thickness of 0.5 mm. The surface of the solvent layer was located 30 mm. below the lower end of the die lip and being continuously fed through a solvent-feeding pipe 8. Thus, the film was cooled and solidified. The solidified film was then taken up by means of pinch rolls 11 having the nip at a position located 150 mm. below the surface of solvent, at a take-up speed of 10 m./min., via a guide roll 17 to give a treated film 13. n-Hexane remaining on the surfaces of film was then removed by evaporation. Thus, Sample No. 8 having both the surfaces roughened was obtained. Sample No. 9 having both the surfaces roughened was obtained in a similar manner except that n-propyl acetate was substituted for n-hexane. Further, Sample No. 10 was obtained similarly but without using any solvent. The properties of these Samples are shown in the following Table.

| Sample No. | Thickness (μ) | Lustre (percent) | Appearance |
|---|---|---|---|
| 8 | 60 | 3 | Roughened surface, white, mat, opaque, paper-like. |
| 9 | 55 | 8 | Do. |
| 10 | 50 | 35 | Flat and smooth surface, lustrous, translucent. |

Sample Nos. 8 and 9 prepared according to the present invention were mat and opaque, and had a white and paper-like appearance, whereas No. 10 was a translucent film having flat and smooth and considerably lustrous surfaces.

EXAMPLE 5

Example 4 was repeated except that a medium density polyethylene having a melt index of 0.5 at 190° C. and a density of 0.935 was substituted for high density polyethylene and n-propyl acetate was substituted for n-hexane. Thus, Sample No. 11 was obtained. Further, Sample No. 12 was obtained similarly but without using any solvent.

No. 11 prepared according to the present invention was white and opaque and had mat and roughened surfaces and a paper-like appearance.

EXAMPLE 6

Figure 4:
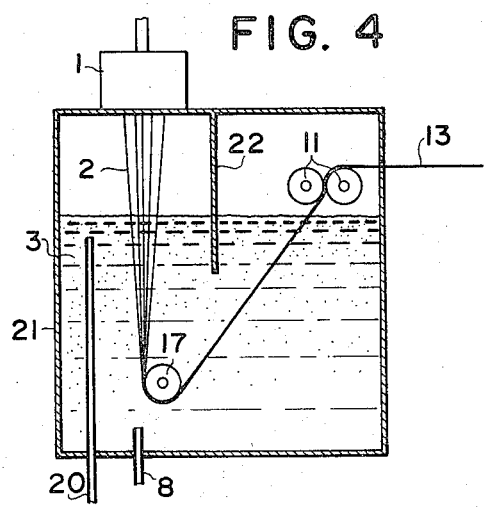

An experiment was carried out using an apparatus as shown in FIG. 4. The numerals shown in FIG. 4 refer to the following matters:

1 monofilament die
2 molten filaments
3 solvent
8 solvent-feeding pipe
11 pinch roll
13 treated filament
17 guide roll
20 solvent-discharging pipe
21 vessel of solvent
22 separating plate for sealing A polypropylene having an intrinsic viscosity of 1.40 and an isotactic index of 96% was extruded from a monofilament die 1 (12 filaments) at 250° C. by means of a usual extruder. The extruded molten filaments 2 were led into a layer of a solvent of n-heptane having the surface at a position 100 mm. below the lower end of the die and maintained at a constant liquid level and at a constant temperature of 60° C. by means of a solvent-feeding pipe 8 and a solvent-discharging pipe 20, to give cooled and solidified filaments. Resultant filaments were taken up via a guide roll 17 located 150 mm. below the surface of liquid, by means of pinch rolls 11, at a take-up speed of 5 m./min., while the attached solvent was squeezed there, whereby treated filaments 13 were obtained. After drying by hot air, Sample No. 13 having a roughened surface was obtained. The immersion distance of the filaments in the solvent in this case was 400 mm.

The above-mentioned procedure was repeated except that water at 60° C. was substituted for n-heptane. Thus, Sample No. 14 having non-roughened surface was obtained. Further, Sample No. 13 was stretched to 5 times the original length in a vessel of hot water at 98° C. to give Sample No. 15. The appearances of these Samples are shown in the following Table:

| Sample No. | Diameter (mm.) | Appearance |
|---|---|---|
| 13 | 1.2 | Mat, roughened surface, white, opaque. |
| 14 | 1.0 | Lustrous, flat and smooth surface, transparent. |
| 15 | 0.7 | Mat, roughened surface, white, opaque. |

As seen in the Table, both of Sample No. 13 obtained by the treatment according to the method of the present invention and No. 15 obtained by stretching No. 13, had a roughened surface, whereas No. 14 showed no roughened surface.

EXAMPLE 7

The experiment of this Example was carried out in a similar manner to Example 6, using the same apparatus as in Example 6, but a high density polyethylene having a melt index of 3.0 at 190° C. and a density of 0.955 was substituted for polypropylene. The polyethylene was melt-extruded from a monofilament die at 230° C., and then led into 1,1,1-trichloroethane maintained at 60° C., where the filaments were cooled and solidified. After taking up at a speed of 20 m./min., the treated filaments were dried by hot air to give surface-roughened Sample No. 16. The above-mentioned procedure was repeated except that cyclohexane, tetrahydrofurane, and water at 60° C. were substituted for 1,1,1-trichloroethane, whereby Sample Nos. 17 and 18 having roughened surface and Sample No. 19 having no roughened surface were obtained. Further, No. 16 was stretched to 5 times the original length in a vessel of hot water at 98° C. to give Sample No. 20. Sample Nos. 16, 17, 18 and 20 prepared according to the present invention had a remarkably roughened surface as seen in the following Table, whereas No. 19 had no roughened surface:

| Sample No. | Diameter (mm.) | Appearance |
|---|---|---|
| 16 | 1.2 | Mat, roughened surface, white, opaque. |
| 17 | 1.2 | Do. |
| 18 | 1.2 | Do. |
| 19 | 1.0 | Lustrous, flat and smooth surface translucent. |
| 20 | 0.7 | Mat, roughened surface, white, opaque. |

EXAMPLE 8

Example 1 was repeated except that n-pentane, cyclopentane, n-propylchloride and i-butylchloride were substituted for n-hexane. Thus, Sample Nos. 21, 22, 23 and 24 were respectively obtained. Any of these was a white and opaque film having a mat and roughened surface.

EXAMPLE 11

Sample No. 2 of Example 1 and Sample No. 10 of Example 4 were each boiled in the respective solvents as shown in the following Table, at respective boiling temperature, for 10 minutes and in a ratio of solvent to resin of 100:1. The solvent remaining on the surface of film was removed by air-drying. The properties of the Samples thus obtained are shown in the following Table. In spite of the boiling of these Samples, only a very small amount of an atactic portion or a lower molecular weight portion was extracted and no dissolution phenomenon of isotactic portion took place. Further, there was almost no change in the flatness, smoothness and lustre of the surface. Thus, the mat, opacity and whiteness due to the surface-roughening which are the specific features of the treatment of the present invention, were not observed at all.

| Sample No. | Original sample | Resin | Solvent | Reduction in weight (percent) | Lustre [3] (percent) | Appearance | Boiling point (° C.) |
|---|---|---|---|---|---|---|---|
| 2 | | PP [1] | | | 112 | Flat, smooth, lustrous surface, transparent | |
| 29 | 2 | PP | n-Pentane | 0.7 | 112 | ....do.... | 36 |
| 30 | 2 | PP | n-Hexane | 1.2 | 108 | ....do.... | 69 |
| 31 | 2 | PP | n-Heptane | 1.9 | 107 | ....do.... | 98 |
| 32 | 2 | PP | Cyclopentane | 1.0 | 109 | ....do.... | 49 |
| 33 | 2 | PP | n-Propylchloride | 0.9 | 110 | ....do.... | 47 |
| 34 | 2 | PP | i-Butylchloride | 1.1 | 109 | ....do.... | 68 |
| 10 | | HDPE [2] | | | 35 | Flat, smooth and considerably lustrous surface, translucent. | |
| 35 | 10 | HDPE | n-Pentane | 0.1 | 35 | ....do.... | 36 |
| 36 | 10 | HDPE | n-Hexane | 0.5 | 33 | ....do.... | 69 |
| 37 | 10 | HDPE | Cyclopentane | 0.4 | 34 | ....do.... | 49 |
| 38 | 10 | HDPE | n-Propylchloride | 0.4 | 34 | ....do.... | 47 |
| 39 | 10 | HDPE | i-Butylchloride | 0.5 | 33 | ....do.... | 68 |

[1] PP=polypropylene.
[2] HDPE=high density polyethylene.
[3] The lustres of Samples No. 2 and 29-34 are those of the outer surface of tube.

EXAMPLE 9

Example 4 was repeated except that n-pentane, cyclopentane, n-propylchloride and i-butylchloride were substituted for n-hexane. Thus, Sample Nos. 25, 26, 27 and 28 were respectively obtained. Any of these was a white and opaque film having a mat and roughened surface.

EXAMPLE 10

Offset printing was applied onto the outer surface of Sample No. 1 of Example 1 using an ink for art paper to give a beautiful printed matter. It was found that, as compared with conventional art paper, the ink setting was so rapid in the case of Sample No. 1 that there was no transfer of ink from the printed surface even immediately after printing, and the anchoring of ink was also sufficient.

On the other hand, printing was impossible upon the surface of Sample No. 2, because ink setting was so slow that ink transfer occurred so remarkably and anchoring of ink was extremely bad. Further, a good quality paper having a thickness of 100μ was applied to the surface of Sample No. 1 with starch paste followed by drying. The resulting product had a peeling strength close to that of a product obtained by applying a good quality paper to each other. On the other hand, with Sample No. 2, such an anchoring was not possible at all.

EXAMPLE 12

Press-shaped sheets composed of the resins as shown in the following Table and having a thickness of 2 mm. were each put on a thin aluminum foil and heated for 10 minutes in an oven maintained at a given temperature. Immediately after taken out, they, together with the aluminum foil, were immersed and cooled for 10 minutes in toluene or n-hexane at 20° C. The temperature rise of the solvent during the period was 1° C. or less. After cooling, the sheets were taken out. The solvent remaining on the surface of the sheets was removed by evaporation by blowing hot air at 60° C. The appearances of the sheets before heating and after solvent-treatment are shown in the following Table.

As apparent from the Table, when polyolefin resins in a molten but preformed state, heated to above their melting points, were quenched and solidified by contacting with a solvent, mat, whiteness and opacity due to remarkable surface-roughening were obtained in either case of toluene or n-hexane. On the other hand, in the case of polyolefin resins not in a molten state, even though they were heated to a temperature close to their melting points and allowing thermal deformation to occur, the above-mentioned effctivenesses could not be obtained at all.

| Resin | Melting point (° C.) | Heating temp. (° C.) | Appearance of sheet Before heating | Appearance of sheet After solvent-treatment [1] |
|---|---|---|---|---|
| PP of Example 1 [2] | 175 | 170 | Flat, smooth and lustrous surface, translucent. | Flat, smooth and lustrous surface similar to that before heating, translucent. |
| | | 180 | | Mat and white surface due to remarkable surface-roughening, opaque. |
| HDPE of Example 4 [3] | 135 | 130 | Flat, smooth and lustrous surface having a milky white feeling, almost opaque. | Flat, smooth and lustrous surface similar to that before heating, a milky white feeling, almost opaque. |
| | | 140 | | Mat and white surface due to remarkable surface-roughening, opaque. |
| MDPE of Example 5 [4] | 120 | 110 | Flat, smooth and lustrous surface, translucent. | Flat, smooth and lustrous surface similar to that before heating, translucent. |
| | | 130 | | Mat and white surface due to remarkable surface-roughening, opaque. |

[1] Among the solvent-treated surfaces, the surface which was not brought in contact with aluminum foil was observed.
[2] PP=polypropylene.
[3] HDPE=high density polyethylene.
[4] MDPE=medium density polyethylene.

What is claimed is:

1. A process for producing shaped articles of crystalline polyolefin resins having a roughened surface which comprises
    (a) maintaining a reservoir of a liquid solvent,
    (b) maintaining a supply of molten polyolefin resin,
    (c) withdrawing molten polyolefin resin from said supply and extruding the withdrawn molten resin into a molten mass that has a thicknes sof 1 mm. or less,
    (d) immediately thereafter, introducing the thus melt-extruded polyolefin resin, while it is still in the form of a molten mass, into said reservoir of liquid solvent to first cool and solidify the surface and thereafter cool the interior of the mass of the polyolefin resin, the cooling and solidification of the surface of the resin being completed within the span of between several tenths of a second and several seconds and the cooling and solidification of the entire mass of crystalline polyolefin resin being completed in one minute or less, said roughening taking place after the resin is introduced as a melt into the solvent and before removing the resin from contact with the solvent,
    (e) removing said cooled and solidified polyolefin resin from said reservoir of liquid solvent and recovering a shaped article of crystalline polyolefin resin having a roughened surface.
    (f) said liquid solvent
        (1) being selected from the group consisting of aliphatic, aromatic, alicylic or halogenated hydrocarbons, heterocyclic compounds, and esters of aliphatic alcohols and aliphatic or aromatic carboxylic acids,
        (2) having a boiling point of 30°–400° C., and
        (3) does not dissolve said crystalline polyolefin resin in an amount of 10% by weight or more at a temperature in the range lower than the boiling point of said solvent,
    (g) said reservoir of liquid solvent being maintained at a temperature which is both
        (1) within the range of about 0°–100° C., and
        (2) below the boiling point of the solvent, and
        (3) below the temperature of said melt-extrudate 2. A process according to claim 1 wherein said reservoir of liquid solvent is floated upon a reservoir of a non-solvent cooling liquid which forms a separate phase from said solvent and being maintained at a temperature which is equal to or lower than said temperature of solvent, said solvent reservoir floated upon said cooling liquid, having a thickness of 0.5 mm. or more.

3. A process according to claim 2 wherein said cooling liquid is water.

4. A process according to claim 1 wherein said resin is crystalline polypropylene and the temperature of said solvent is in the range of 0°–70° C.

5. A process according to claim 1 wherein said resin is high density polyethylene and the temperature of said solvent is in the range of 0°–60° C.

6. A process according to claim 1 wherein said solvent is an aliphatic or alicyclic hydrocarbon having a boiling point of 30°–100° C.

7. A process according to claim 1 wherein said solvent is selected from the group consisting of pentane, hexane, heptane, octane, nonane, decane, gasoline, petroleum ether, petroleum benzine, ligroin, kerosene, gas oil, liquid paraffin; benzene, toluene, xylene; cyclopentane, cyclohexane, methylcyclohexane, cycloheptane, decahydronaphthalene, tetrahydronaphthalene; tetrahydrofuran; monochloropropane, monochlorobutane, monochloropentane, trichloroethane, tetrachloroethane, trichloroethylene, tetrachloroethylene; propyl acetate, butyl acetate, amyl acetate, dioctyl adipate, dioctyl sebacate and dioctyl phthtalate.

References Cited
UNITED STATES PATENTS

| | | | |
|---|---|---|---|
| 3,155,754 | 11/1964 | Adams | 264—343 |
| 3,179,484 | 4/1965 | Tessandori | 264—343 |
| 2,979,774 | 4/1961 | Rusignolo | 264—343 |

ROBERT F. WHITE, Primary Examiner

G. AUVILLE, Assistant Examiner

U.S. Cl. X.R.

264—95, 180, 209, 237, 343